United States Patent [19]
Kitazawa et al.

[11] Patent Number: 5,887,210
[45] Date of Patent: Mar. 23, 1999

[54] CAMERA HAVING MOTOR DRIVEN MECHANISM

[75] Inventors: Toshiyuki Kitazawa; Yutaka Ohsawa, both of Tokyo, Japan

[73] Assignee: Asahi Kogaku Kogyo Kabushiki Kaisha, Tokyo, Japan

[21] Appl. No.: 350,995

[22] Filed: Nov. 29, 1994

[30] Foreign Application Priority Data

Nov. 30, 1993 [JP] Japan .................................. 5-068435

[51] Int. Cl.⁶ ............................................ G03B 17/42
[52] U.S. Cl. .......................................................... 396/402
[58] Field of Search ..................................... 354/152, 153, 354/484, 204; 396/358, 401, 402, 134; 318/452, 453, 454, 447; 361/28, 29

[56] References Cited

U.S. PATENT DOCUMENTS

| | | | |
|---|---|---|---|
| 3,673,981 | 7/1972 | Beckham et al. | 118/6 |
| 4,062,028 | 12/1977 | Tezuka et al. | 354/152 |
| 4,538,893 | 9/1985 | Nakano et al. | 354/412 |
| 4,697,899 | 10/1987 | Kawamura et al. | 354/173.11 |
| 4,741,192 | 5/1988 | Wallis | 72/187 |
| 4,881,092 | 11/1989 | Fukahori et al. | 354/152 |
| 4,951,444 | 8/1990 | Epstein et al. | 53/77 |
| 4,992,821 | 2/1991 | Kiuchi et al. | 354/484 |
| 5,012,271 | 4/1991 | Nishimura et al. | 354/456 |
| 5,049,909 | 9/1991 | Ishikawa et al. | 354/173.1 |
| 5,122,828 | 6/1992 | Kobayashi et al. | 354/412 |
| 5,255,034 | 10/1993 | Shimada et al. | 354/173.1 |
| 5,274,407 | 12/1993 | Haraguchi et al. | 354/173.1 |
| 5,276,563 | 1/1994 | Ogawa | 360/35.1 |
| 5,309,184 | 5/1994 | Kitazawa et al. | 354/231 |
| 5,331,262 | 7/1994 | Francisco | 318/452 |

*Primary Examiner*—Safet Metjahic
*Assistant Examiner*—Christopher E. Mahoney
*Attorney, Agent, or Firm*—Greenblum & Bernstein, P.L.C.

[57] ABSTRACT

A camera having a cocking mechanism for a shutter and/or mirror, and a lithium battery supplying power to the cocking mechanism. The cocking operating of the mechanism is controlled to be executed intermittently if the cocking operation is not completed within a first predetermined time interval due to low power of the lithium battery.

16 Claims, 7 Drawing Sheets

CAMERA HAVING MOTOR DRIVEN MECHANISM

BACKGROUND OF THE INVENTION

The present invention relates to a camera having a motor driven mechanism, and more specifically, to a camera in which a cocking mechanism for cocking a shutter and/or a mirror, and a mechanism for winding a film are motor driven.

Conventionally, cameras have been manufactured equipped with a motor driven mechanism such as a mechanism for cocking the shutter and a quick-return mirror. A power source is also provided for supplying power to the motor driven mechanisms. However, if the power of the power source is relatively low, more time than normal may be spent trying to drive the motor driven mechanism. In order to ensure that the operation of the motor driven mechanism is completed, the motor driven mechanisms described above are generally designed to be actuated for a predetermined period of time.

Further, if the camera is equipped with another motor driven mechanism such as a film winding mechanism, and the shutter/mirror cocking mechanism and the film winding mechanism are driven by different motors, both motors are usually actuated at the same time. However, if the power of the battery is low, in a conventional system, the two mechanisms are driven one after another. For example, the motors are controlled such that the cocking operation is performed first, followed by the film winding operation. However, under certain circumstances, e.g., low ambient temperature, or low power of the battery, an extremely long time may be spent trying to complete the cocking and film winding operations, or the cocking operation may not be completed.

SUMMARY OF THE INVENTION

It is therefore an object of the present invention to provide a camera which can drive motor driven mechanisms equipped therein by drawing as much power as possible from a battery with a simple control.

It is another object of the present invention to provide a camera which can drive motor driven cocking and film winding mechanisms properly, even if the power of the battery is low.

In order to achieve the objects, according to these present invention, there is provided a camera having a motor driven mechanism and a power source supplying power to at least the motor driven mechanism. The camera includes a mechanism for initiating a predetermined operation of the motor driven mechanism, a mechanism for detecting a completion of the predetermined operation, and a mechanism for controlling the predetermined operation to be executed intermittently if the predetermined operation is not completed within a first predetermined time interval. Thus, the battery is used such that the motor driven mechanism draws as much power as possible from the battery. Further, the operation of the motor driven mechanism can be completed accurately.

Optionally, the motor driven mechanism may include a mechanism for cocking a shutter and/or a mechanism for cocking a quick-return mirror. Further, the invention can be applied to a camera having any type of motor driven mechanism which can perform its operation intermittently.

Further optionally, the predetermined operation is executed upon completion of an exposure operation of the camera, and another exposure operation is ready to be executed within a short period of time.

Still optionally, the power source is a lithium battery. When the predetermined operation is executed intermittently, each execution of the predetermined operation is separated by a second predetermined time interval, during which the battery recovers a sufficient amount of power to enable execution of the predetermined operation. Thus, the predetermined operation is quite likely to be completed.

Still further optionally, the power source is a lithium battery, and the first predetermined time interval is a maximum time required to execute the predetermined operation when a voltage of the battery is larger than a predetermined value. In other words, if sufficient power is available, the predetermined operation is completed within the first predetermined time interval.

Preferably, the number of times of intermission of the predetermined operation is limited. Thus, if the power of the power source is too low, the predetermined operation is terminated even if it is not completed.

Optionally, the predetermined operation is executed by a single motor to which the power of the power source is applied. Note that the number of motors is not limited to one, but the invention can be applied to a mechanism or an operation using two or more motors.

Further optionally, the camera has another motor driven mechanism for performing another predetermined operation. The other motor driven mechanism includes another motor for generating a drive force to execute the other predetermined operation, in which power is being supplied to the other motor from the power source. Thus, two different mechanisms having respective motors are driven, the power source supplies power to both mechanisms. It is apparent that the two motors may be driven intermittently if the operations are not completed within a certain time interval.

Furthermore, the other predetermined operation can be completed with less power and less time than the predetermined operation. Thus, the other predetermined operation is likely to be completed, even if the power of the battery is low and the predetermined operation and the other predetermined operation are executed simultaneously.

Further optionally, the predetermined operation of the motor driven mechanism and the other predetermined operation of the other motor driven mechanism are initiated substantially at the same time. Since the predetermined operation can be intermittently executed, both predetermined operations may be properly completed.

Furthermore, the other motor driven mechanism is a film winding mechanism. Therefore, the film is properly wound after the exposure operation is executed, and the predetermined operation will likely be to be completed.

According to another aspect of the invention, there is provided a method of controlling a motor driven mechanism used in a camera having a power source supplying power to at least the motor driven mechanism. The method includes the steps of:
 initiating a predetermined operation of the motor driven mechanism,
 detecting a completion of the predetermined operation, and
 controlling the predetermined operation to be executed intermittently if the predetermined operation is not completed within a first predetermined time interval.

BRIEF DESCRIPTION OF THE DRAWINGS

FIG. 5 shows an initialization routine performed by the control circuit of FIG. 2 when a power switch is first turned ON.

DESCRIPTION OF THE EMBODIMENTS

Figure 1A:
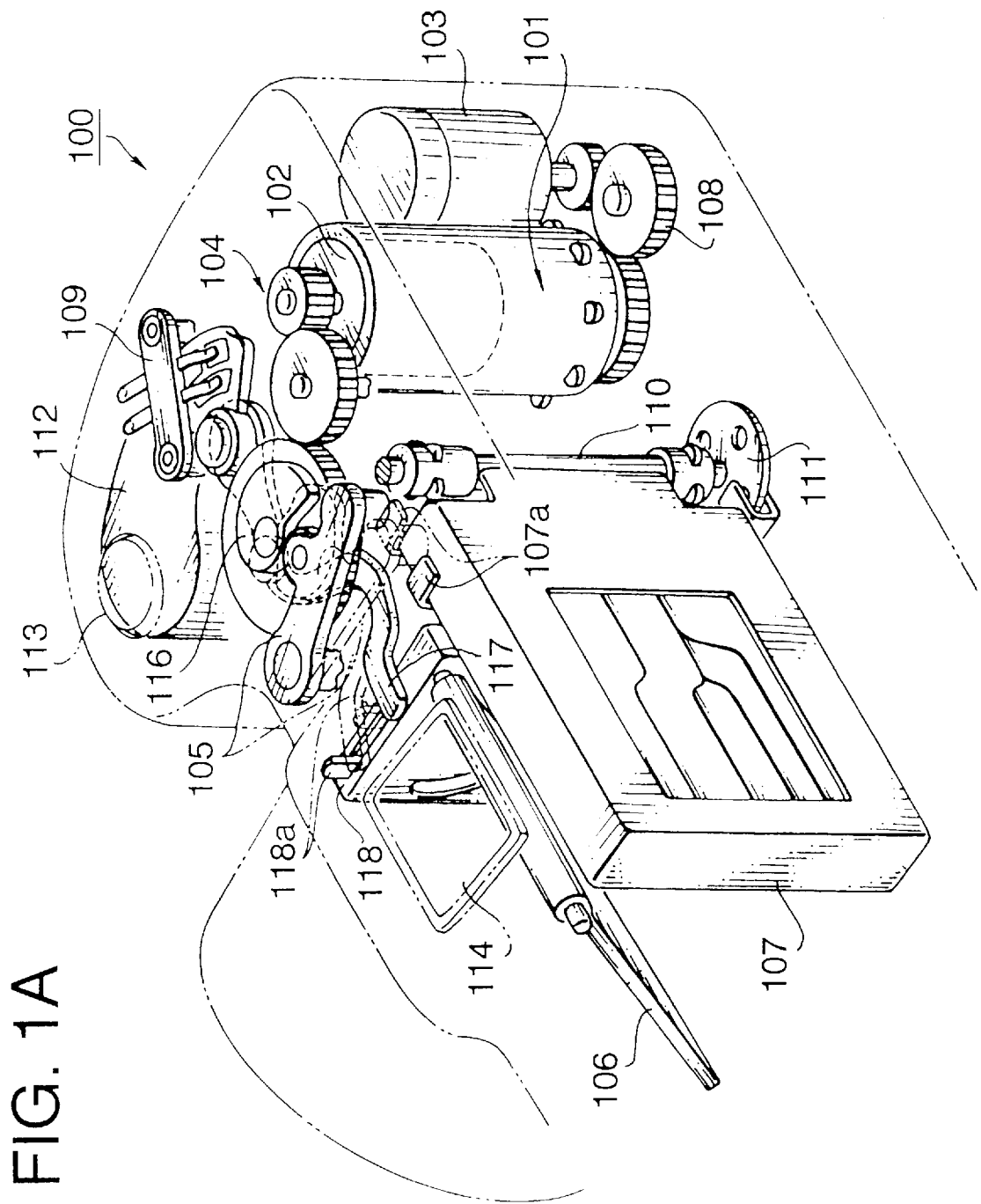
FIGS. 1A and 1B show internal views of a camera which embodies the present invention.

FIG. 1A shows a partial perspective view of an internal portion of an SLR (single lens reflex) camera 100 to which the present invention is applied. The camera 100 includes a winding spool 101 onto which film is wound, a first motor 102 for cocking a mirror mechanism 118, a shutter mechanism 107, and a second motor 103 for driving the winding spool 101. A gear train 104 and cocking lever 105 are used to convey driving forces from the first motor 102 to the mirror mechanism 118 and shutter mechanism 107. The mirror mechanism 118 controls the movement of a mirror 106 during an exposure operation of the camera 100. A gear train 108 connects the second motor 103 to the winding spool 101. Further, during a film rewinding operation, the second motor 103 is connected through another gear train to a rewinding fork (both not shown).

A cocking detector 109 is used to detect the completion of the cocking operation, which is described later.

A shaft 110 has sprockets formed thereon to engage sprocket holes formed in the film. When the film is being wound, the shaft 110 is rotated about an axis thereof, resulting in the rotation of encoder 111. As encoder 111 rotates, electrical pulses are output. These electrical pulses are fed to a CPU 126 (see FIG. 2) which can determine the amount of film winding by counting the number of pulses output by the encoder 111.

Camera 100 further includes a lithium battery 112 used to supply power to the camera, a shutter release button 113 and an LCD display 114. The shutter release button 113 and LCD display 114 are located on a top surface of the camera 100.

Figure 2:
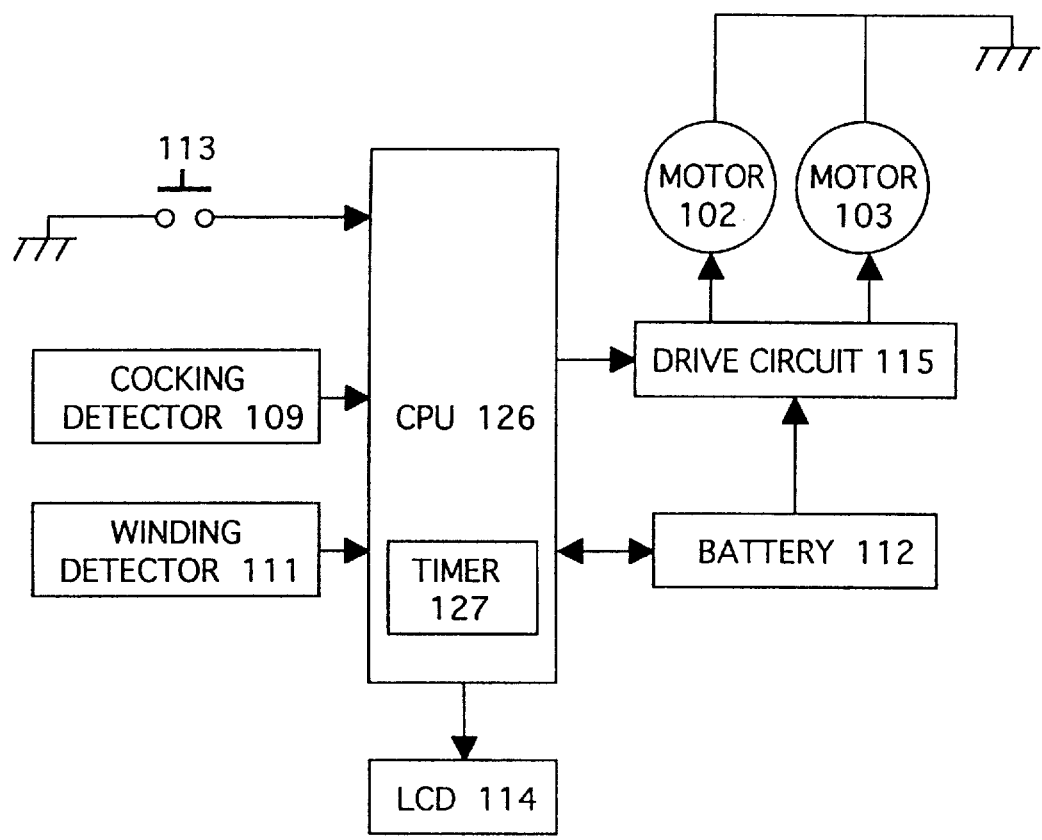
FIG. 2 shows a block diagram of a control circuit employed in the camera shown in FIG. 1.

FIG. 2 shows a block diagram of a control circuit of the camera 100. The CPU 126 having a timer 127 controls the film winding and cocking operation of the mirror mechanism 118 and shutter mechanism 107. As shown in FIG. 2, information about the status of the cocking of the mirror mechanism 118 and shutter mechanism 107 as well as the film winding, is supplied to the CPU 126 from the cocking detector 109 and encoder 111, respectively. The CPU 126 then controls the drive circuit 115 to drive the first motor 102 and second motor 103 in accordance with the data obtained from the cocking detector 109 and encoder 111. The battery 112 supplies power to the CPU 126, as well as the drive circuit 115. Further, the CPU 126 checks the voltage of the battery 112 to determine whether the battery has sufficient power to drive the first motor 102 and second motor 103.

The shutter release button 113 is also connected to the CPU 126. When the shutter release button 113 is fully depressed (i.e., turned ON), the CPU 126 executes an exposure operation.

Figure 1B:
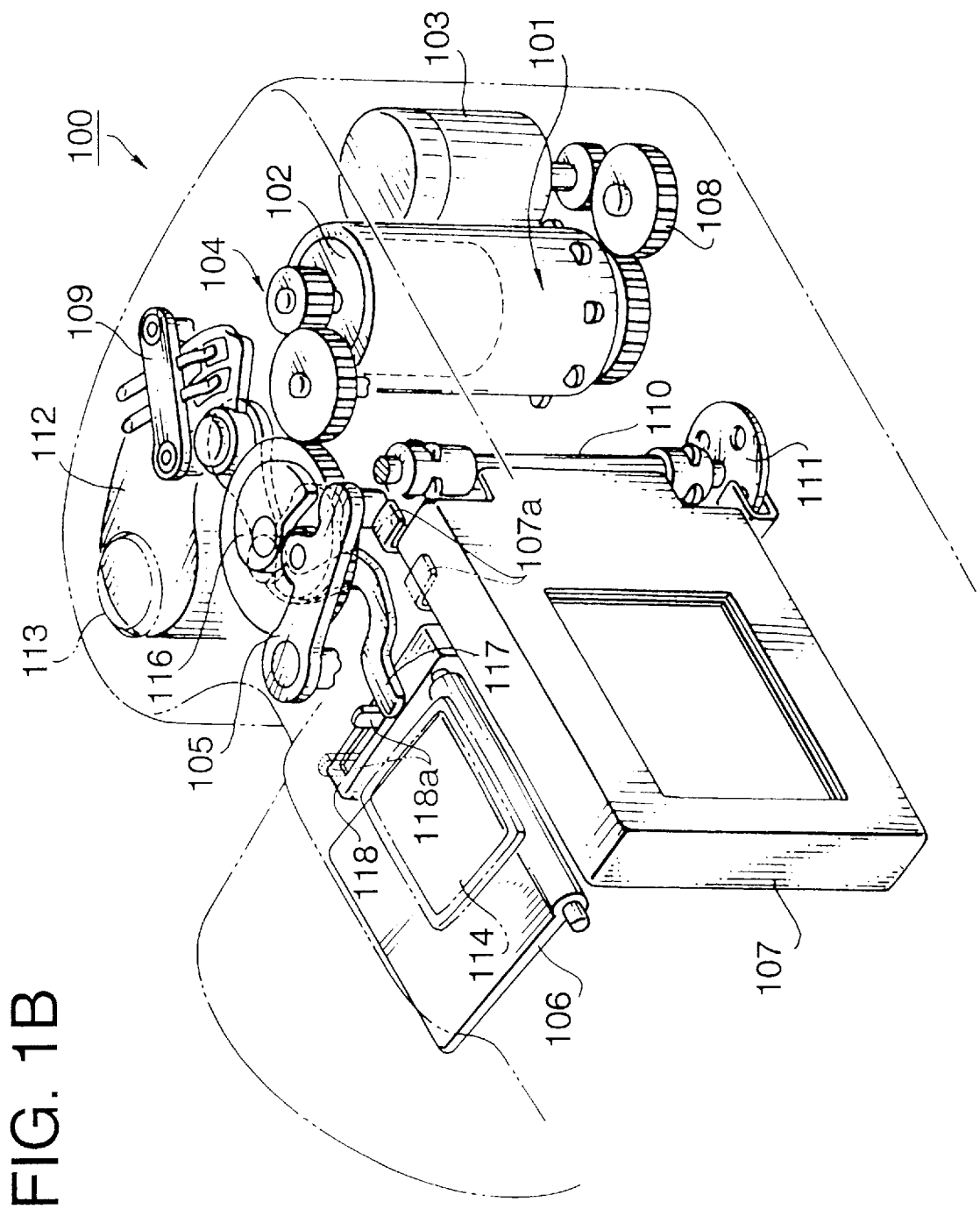

The cocking operation will be explained with reference to FIG. 1A and 1B.

When the shutter release button 113 is depressed, an exposure operation starts. Before exposure of the film, the mirror 106 is lifted out of the optical path and the shutter is opened for a predetermined time, as shown in FIG. 1B. In an SLR camera of the type to which the present invention is applied, a mirror lifting operation is conventionally carried out by a quick-return mechanism, and a shutter opening operation is conventionally carried out by a focal plane shutter mechanism. Both the quick-return mirror and focal plane shutter are well known mechanisms, and typically each may be charged or "cocked" by means of a linearly movable cocking member extending from the respective cocking mechanisms. Such a cocking or charging operation puts the respective cocking mechanisms in a standby state to carry out the necessary quick-return mirror or shutter operations.

The CPU 126 controls first motor 102 to be rotated by a predetermined amount. This rotates shutter cam 116 and a mirror cam (not shown) using the gear train 104. The shutter cam 116 contacts shutter cocking lever 105 thereby moving the cocking lever 105 to cock the shutter mechanism 107, when the distal end of the swingable lever cocking 105 pushes the linearly movable shutter cocking member 107a of the shutter mechanism 107. Similarly, the mirror cam moves the mirror cocking lever 117 thereby cocking the mirror mechanism 118, when the distal end of the swingable mirror cocking lever 117 pushes the linearly movable mirror cocking member 118a of the mirror mechanism 118. The swingable mirror cocking lever 117 is associated with the cocking detector 109, and swings the movable portion of cocking detector 109, in unison with the swingable lever 117, underneath a set of stationary electrical pins. The structure of the cocking detector and swingable lever is disclosed in U.S. Pat. No. 5,309,184, the disclosure of which incorporated by reference herein in its entirety.

The movement of the mirror cocking lever 117 to a position in which the mirror mechanism 118 is cocked results in an electrical connection being established between electrical contacts and the stationary electrical pins in the cocking detector 109. The CPU 126 monitors a signal applied to the cocking detector 109 to determine whether the mirror mechanism 118 and shutter mechanism 107 are cocked. If the signal is present, then the CPU 126 determines that the mirror mechanism 118 and shutter mechanism 107 are cocked.

Figure 3A:
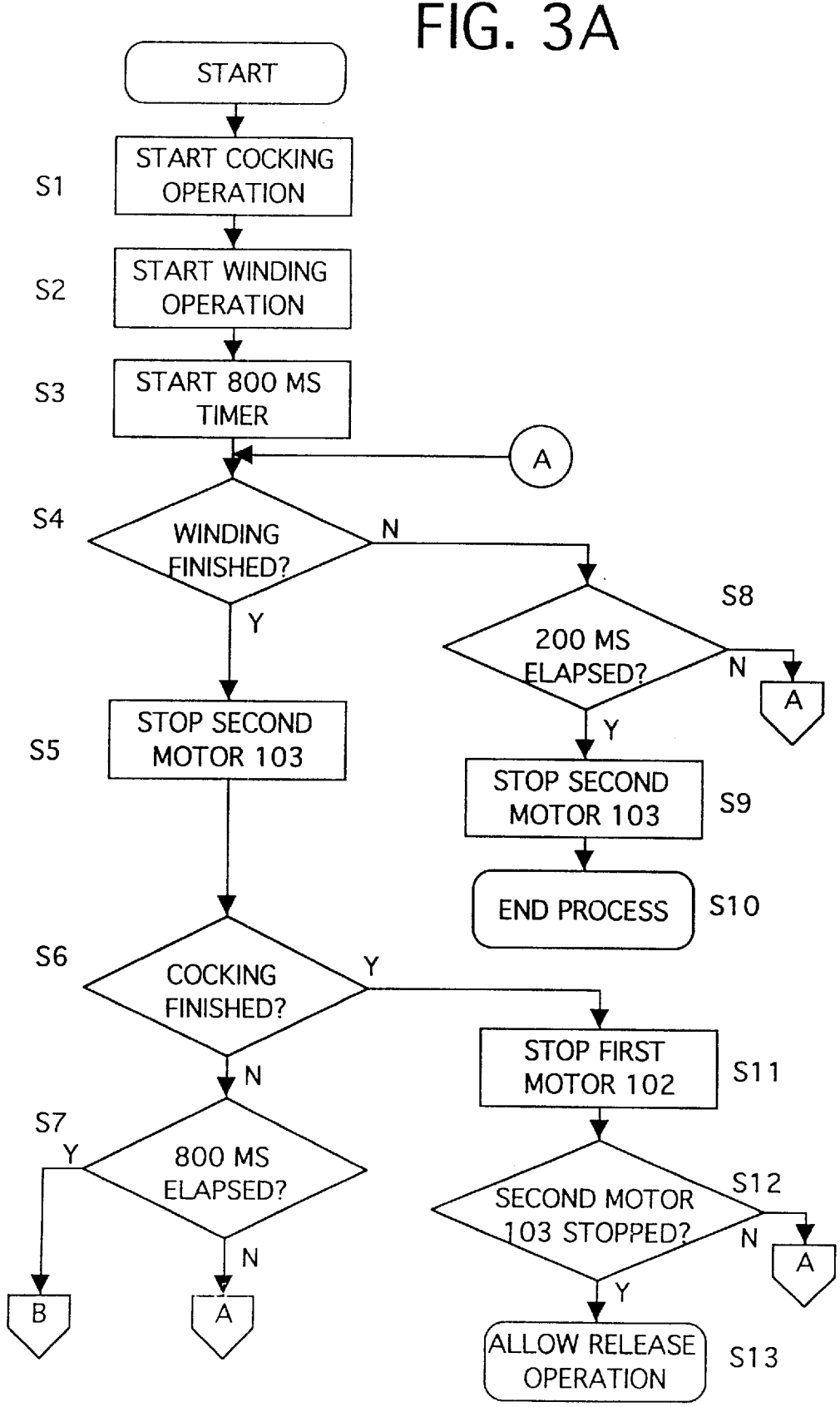
FIGS. 3A and 3B show a flowchart of a main routine of the control circuit shown in FIG. 2.
Figure 3B:
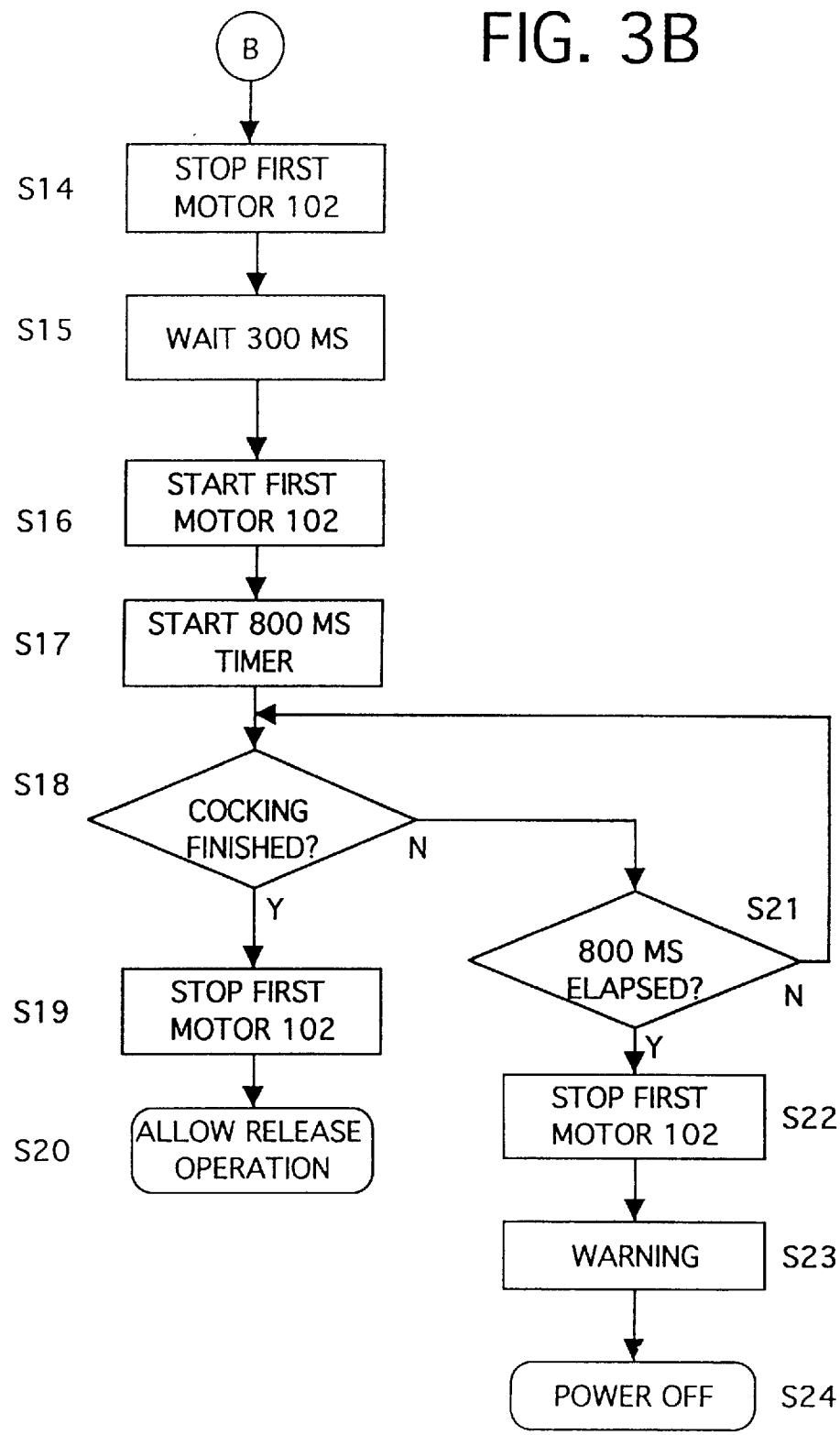

FIGS. 3A and 3B show a flowchart of a main routine of the CPU 126. In the embodiment, a cocking operation is intermittently executed if it is not completed within a first predetermined period. The power battery is supposed to be recovered after an interruption.

The reason why the voltage is recovered will be explained below.

In a battery, polarization occurs. Polarization is a phenomenon where an open circuit voltage of the battery (the voltage of the battery when no circuit is connected thereto) and a closed circuit voltage (the voltage of the battery when a circuit is connected thereto) are different. The voltage difference is referred to as an overvoltage. The closed circuit voltage is lower than the open circuit voltage.

The overvoltage depends on the condition of the electrodes, electrolyte and the diffusion of the reacting substance in the battery. Further, the overvoltage is affected by a configuration of the electrodes and electrolyte inside the battery.

Before the chemical reaction starts in the battery, the reacting substance is evenly distributed in the battery. While the chemical reaction is proceeding, the distribution of the reacting substance is less present around the electrodes than around the other portions of the battery. If the battery is used continuously, the reacting substance may be consumed at the electrodes faster than it can be supplied from the other portions of the battery, thereby increasing the polarization of the battery. If the battery is used intermittently, the reacting substance may be sufficiently supplied to the electrodes, thereby reducing or eliminating the polarization and recovering the closed circuit voltage of the battery.

Initially in step S1, the cocking operation and a winding operation are started in steps S1 and S2. In step S3, the timer 127 is programmed to measure an 800 ms time period. In step S4, the CPU 126 determines whether winding of the film is completed, by comparing a number of pulses output by encoder 111 with a predetermined number.

If the CPU 126 determines that winding is finished (S4:YES), then the second motor 103 is stopped in step S5. However, if winding is not finished (S4:NO), then control goes to step S8 where the CPU 126 determines whether 200 ms has elapsed since the timer 127 was started. If the 200 ms time period has elapsed (S8:YES), then the second motor 103 is stopped in step S9 and the sequence is ended in step S10. The 200 ms time period corresponds to the amount of time sufficient to advance the film by one frame. If the 200 ms time period has not elapsed (S8:NO), then control goes to step S4.

After the second motor 103 has been stopped in step S5, the CPU 126 determines whether the cocking operation has finished in step S6, by monitoring the signal at the cocking detector 109. If the cocking operation is finished (S6:YES), then control goes to step S11 where the first motor 102 is stopped. Then at step S12, the CPU 126 determines whether the second motor 103 is stopped. If the second motor 103 has stopped in step S12, then step S13 allows the release operation to be performed. Otherwise, control goes back to step S4.

If the cocking operation has not finished (S6:NO), the CPU 126 determines whether 800 ms has elapsed, in step S7. If the 800 ms time period has not elapsed (S7:NO), control goes to step S4. If the 800 ms time period has elapsed (S7:YES), the first motor is stopped in step S14. The CPU 126 waits 300 ms in step S15, before starting the first motor 102 again in step S16. Because of the reason described above, the power of the battery is supposed to be recovered within the 300 ms interruption. Then the timer 127 is again started, having been programmed by the CPU 126 to count down an 800 ms time period, in step S17. In step S18, the CPU 126 determines whether the cocking operation has finished by monitoring the status of the cocking detector 109. If the cocking operation has finished, the first motor 102 is stopped in step S19 and the release operation is allowed in step S20.

If the cocking operation was not finished in step S18, then the CPU determines in step S21 whether the 800 ms time period has elapsed. If the 800 ms time period has not elapsed (S21:NO), control goes to step S18. Otherwise, the first motor 102 is stopped in step S22, a warning is indicated in step S23, and the power is turned OFF in step S24.

As shown by the flowchart of FIGS. 3A and 3B, if the cocking of the mirror mechanism 118 and shutter mechanism 107 is not completed within a predetermined time (i.e., 800 ms), the first motor 102 is interrupted for a predetermined time period of 300 ms in step S15. The cocking operation may not be completed if the power available from the battery 112 is too low. The battery 112 used in the camera 100 has the property that some of its power can be recovered if the battery is not used for a short period of time. Therefore, it is advantageous to interrupt the operation of the first motor 102 for a short time interval, in order to allow the battery 112 to recover some of its power. Then by restarting the first motor 102 in step S16, it is likely that sufficient power was recovered by the battery 112 in order to complete the cocking operation. Further, as the cocking operation consumes more power than the winding operation, only the first motor 102 which controls the cocking operation, is driven after the 300 ms time period has elapsed in step S15. This results in a smaller electrical load on the battery 112 at step S16.

Figure 4:
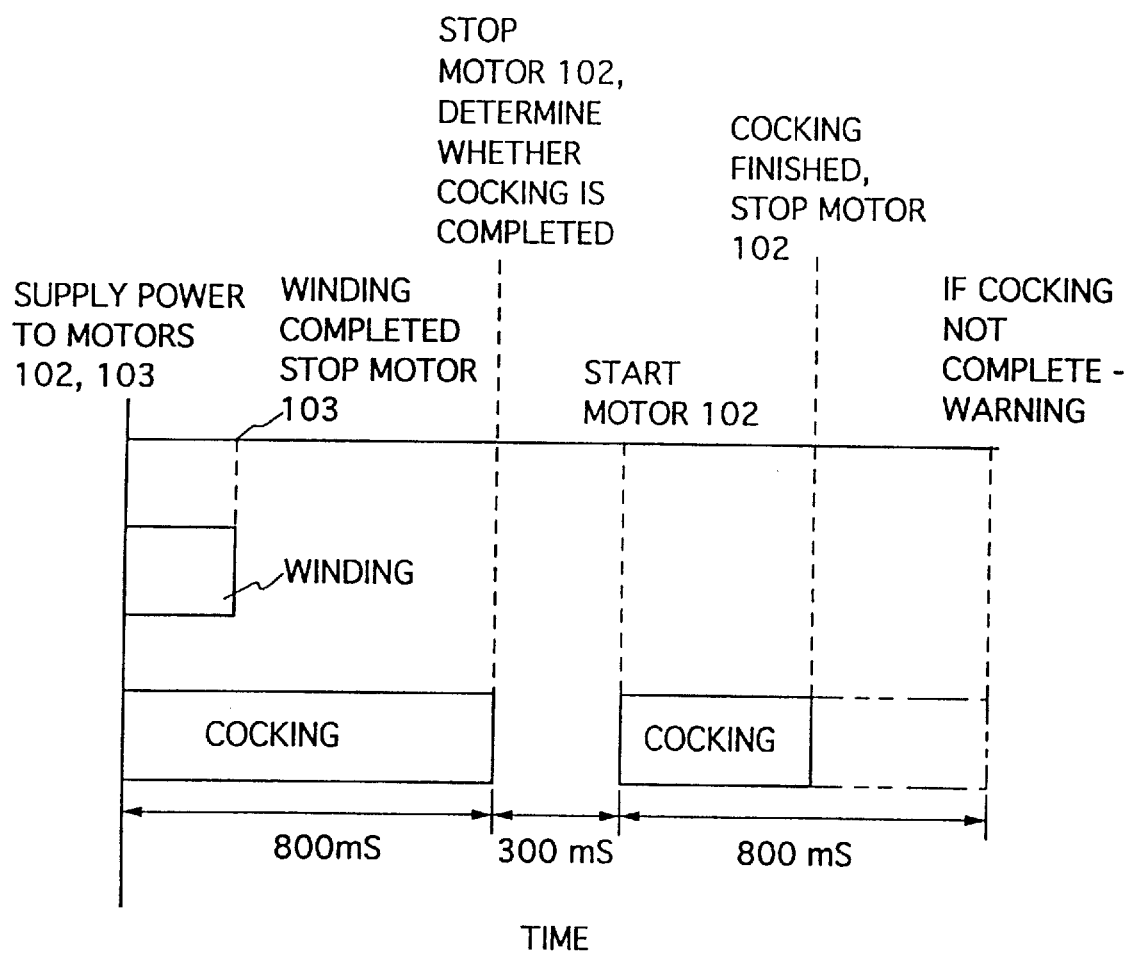
FIG. 4 shows a timing diagram of the operation shown in FIGS. 3A and 3B.

A timing diagram of the operation described in FIGS. 3A and 3B is shown in FIG. 4.

Initially power is supplied to first and second motors 102 and 103, respectively. This results in both the winding and cocking operation being performed simultaneously. If after 800 ms the cocking operation has not been completed, the first and second motors 102 and 103 are stopped, and the CPU 126 waits for 300 ms. Then the first motor 102 is driven again to perform the cocking operation. If another 800 ms has elapsed and the cocking operation is still not completed, a warning is indicated.

Figure 5:
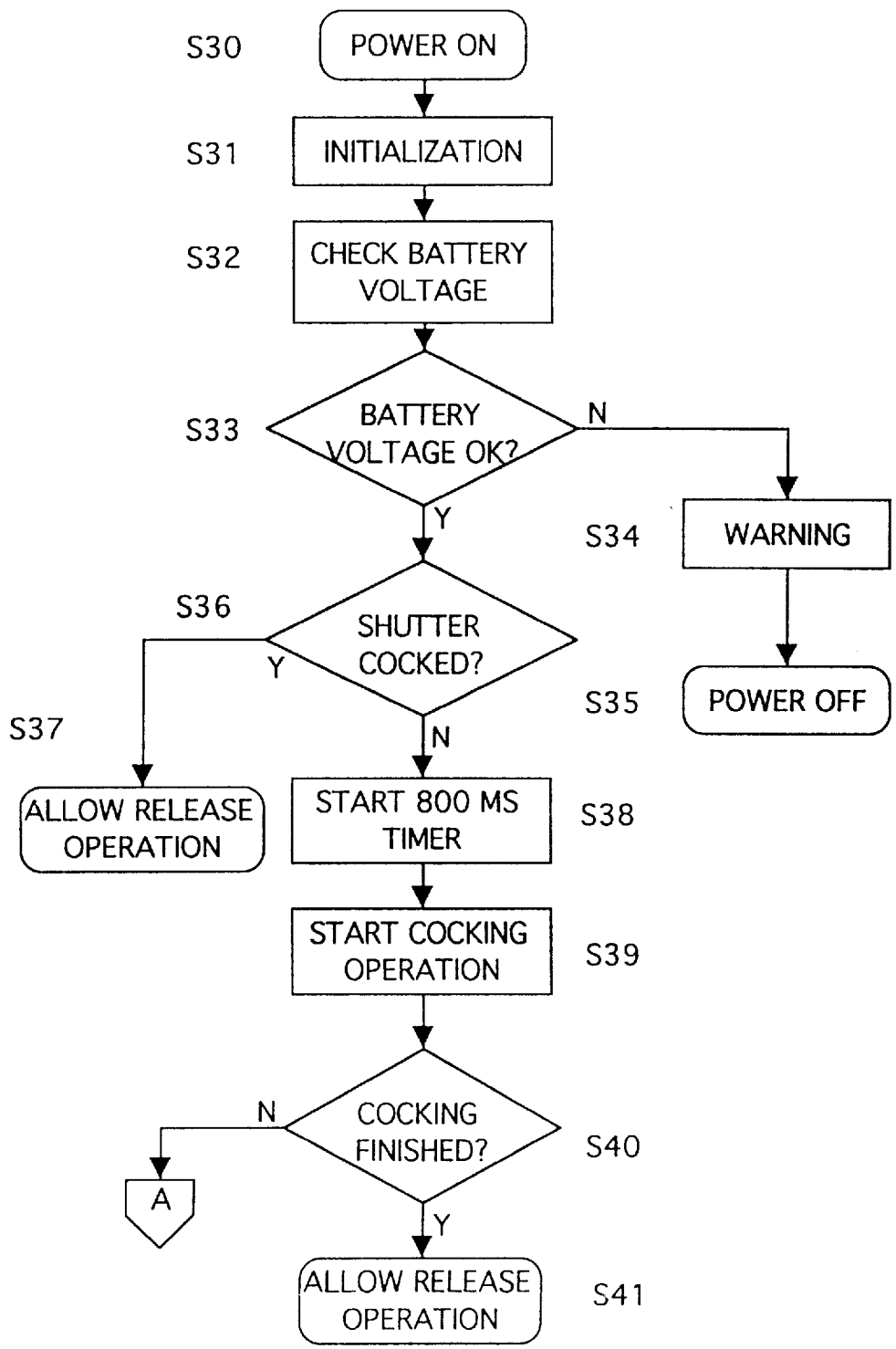

FIG. 5 shows a flowchart of a routine when the power is turned ON in the camera.

When the power is turned ON in step S30, an initialization step is performed in step S31. Then the voltage of the battery 112 is checked in step S32. If the CPU 126 determines that the battery voltage is lower than a predetermined amount, a warning is indicated in step S34 and the power is turned OFF in step S35. However, if the CPU 126 determines that the battery voltage is above the predetermined level (S33:YES), then the signal at the cocking detector 109 is monitored in step S36 to determine whether the shutter mechanism 107 is cocked.

If the shutter is cocked (S36:YES), then the release operation is allowed in step S37. Otherwise, control goes to step S38 where the timer 127 is programmed for an 800 ms time period. Then in step S39 the cocking operation is started. At step S40, the CPU 126 monitors the cocking detector 109 to determine whether the cocking operation is finished. If the cocking operation has finished in step S40, then the release operation is allowed in step S41. Otherwise, control goes to step S4 of the routine shown in FIG. 3A.

As described above, by monitoring the cocking detector, the CPU 126 can determine whether the mirror mechanism 118 and shutter mechanism 107 are cocked. If it is determined that the cocking operation was not completed, the CPU 126 waits for a predetermined time, then drives the motor 102 again in order to perform the cocking operation. During the predetermined time, the battery 112 has sufficient time to recover some of the power thereby enabling it to drive the first motor 102.

Thus, the battery is used such that the motor driven mechanism draws as much power as possible from the battery. Further, the operation of the motor driven mechanism can be completed accurately.

The present disclosure relates to subject matter contained in Japanese Utility Model Application No. HEI 5-068435 filed on Nov. 30, 1993, which is expressly incorporated herein by reference in its entirety.

What is claimed is:

1. A camera having motor driven mechanisms and a power source, said motor driven mechanisms including:
    a mechanism for winding film loaded in said camera; and
    a mechanism for cocking at least one of a shutter and a mirror used in said camera, said camera comprising:
        a timer, a detector that detects at least an end movement of said cocking mechanism;

a controller that controls an operation of said film winding mechanism and said cocking mechanism, wherein after an exposure of a film has been completed, said controller initiates said film winding mechanism and said cocking mechanism simultaneously, wherein said detector outputs a signal to said controller when said end movement of said cocking mechanism is detected, and wherein said controller further comprises a determiner that determines whether said detector has detected said end movement of said cocking mechanism, wherein when said determiner determines that said end movement of said cocking mechanism has not been detected within a first predetermined time interval, said controller stops operation of said cocking mechanism and controls said cocking mechanism to continue said cocking operation after a second predetermined time interval has elapsed.

2. A camera according to claim 1, wherein said film winding mechanism and said cocking mechanism comprise respective motors for generating a driving force therefor, said power source supplying power to said motors.

3. A camera having a motor driven mechanism and a power source that supplies power to the motor driven mechanism, the motor driven mechanism including a mechanism for cocking at least a shutter used in said camera, said camera comprising:

a timer, a detecting system, said detecting system detecting at least an end movement of said cocking mechanism; and a control system, said control system controlling said cocking mechanism, said control system initiating an operation of said cocking mechanism after exposure of a film has been completed;

wherein said detecting system outputs a signal to said control system when said end movement of said cocking mechanism is detected, said control system further comprises a determining system, said determining system determining whether said detecting system has detected said end movement of said cocking mechanism, and, when said determining system determines that said end movement of said cocking mechanism has not been detected within a first predetermined time interval, said control system stops operation of said cocking mechanism and controls said cocking mechanism to continue said cocking operation after a second predetermined time interval has elapsed.

4. The camera according to claim 3, wherein said camera is a single lens reflex camera having a quick-return mirror, and wherein said motor driven mechanism includes a cocking mechanism of said quick-return mirror.

5. The camera according to claim 3, wherein another exposure operation is allowed to be performed only when said cocking operation is completed.

6. A camera having a motor driven mechanism according to claim 3, wherein said power source comprises a lithium battery;

wherein when said control system controls said cocking mechanism to continue said cocking operation said cocking operation is executed intermittently, each execution of said cocking operation being separated by said second predetermined time interval;

whereby, during said second predetermined time interval, said battery recovers a predetermined amount of power.

7. The camera according to claim 3, wherein said power source comprises a lithium battery;

wherein said first predetermined time interval is a maximum time required to execute said cocking operation when a voltage of said battery is greater than a predetermined value.

8. The camera having a motor driven mechanism according to claim 3, wherein, when said control system controls said cocking mechanism to continue said cocking operation in an intermittent manner, a number of times of intermittent execution of said cocking operation is limited.

9. The camera according to claim 3, said motor driven mechanism comprising a motor for generating a drive force to execute said cocking operation.

10. The camera according to claim 9, further comprising a second motor driven mechanism for performing a predetermined operation, said second motor driven mechanism comprising a second motor for generating a drive force to execute said predetermined operation, wherein power is supplied to said second motor from said power source.

11. The camera according to claim 10, wherein said predetermined operation can be completed with less power and during less time than said cocking operation.

12. The camera according to claim 11, wherein said cocking operation of said motor driven mechanism and said predetermined operation of said second motor driven mechanism are initiated at the same time.

13. The camera according to claim 12, wherein said second motor driven mechanism comprises a film winding mechanism.

14. The camera having a motor driven mechanism according to claim 3, wherein if completion of said cocking operation is not detected within said first predetermined time interval said control means stopping operation of said cocking mechanism and, after a second predetermined time interval has elapsed, controlling said cocking mechanism to continue said cocking operation.

15. The camera having a motor driven mechanism according to claim 3, the power source is comprising a battery and said second interval comprising an interval that permits said battery to recover at least some power.

16. The camera having a motor driven mechanism according to claim 15, said second interval being shorter than said first interval.

* * * * *

UNITED STATES PATENT AND TRADEMARK OFFICE
CERTIFICATE OF CORRECTION

PATENT NO. : 5,887,210
DATED : March 23, 1999
INVENTOR(S) : T. KITAZAWA et al.

It is certified that error appears in the above-identified patent and that said Letters Patent is hereby corrected as shown below:

At column 8, line 5 (claim 6, line 5) of the printed patent, after "operation" insert -- , --.

At column 8, line 45 (claim 14, line 4) of the printed patent, after "interval" insert -- , --.

Signed and Sealed this

Second Day of May, 2000

Attest:

Q. TODD DICKINSON

*Attesting Officer*        *Director of Patents and Trademarks*